2,873,213

PERACETIC ACID TREATMENT OF VULCANIZED RUBBER

Bernard K. Easton, Williamsville, and Norbert Weinberg, Buffalo, N. Y., and Albert Peniston Shutts, Wyckoff, N. J., assignors to Food Machinery and Chemical Corporation, San Jose, Calif.

No Drawing. Application October 24, 1956
Serial No. 617,916

3 Claims. (Cl. 117—118)

This invention relates to a process of detackifying and improving the luster of vulcanized rubber products, particularly such rubber products as overshoes, dipped rubber good and the like, and to the products of this process.

The various rubbers, that is natural rubber and the various rubbery, synthetic conjugated diene polymers and copolymers, frequently possess a high degree of surface tack following their vulcanization. Furthermore, the vulcanized products in many instances have dull, unattractive surface finishes. It has become common to treat such vulcanized rubber products in an attempt to overcome these disadvantages, for example by application to the surface of the vulcanized rubber of bromine. While this method has met with considerable acceptance, it has the disadvantage of requiring the use of the noxious and poisonous bromine gas, and therefore of being unpleasant and dangerous in application. Furthermore, while use of this method results in products having satisfactorily reduced tackiness, it results in little or no improvement in the luster of the product, even in some cases deleteriously affecting the color of the product. A different approach to the problem of detackifying and providing gloss to vulcanized rubber products has involved the application of lacquer finishes to them. This method has been found useful, however it represents the provision of a coating on the rubber rather than a modification of the rubber surface, and accordingly does not solve the basic problem residing in the undesirable characteristics in the rubber itself.

It is a feature of this invention to provide a method for detackifying and improving the surface luster of vulcanized rubber products by a modification of the rubber surface, which method is inexpensive and safe and which may be operated in simple equipment.

It is a further feature of this invention to provide vulcanized rubber products which are substantially free of surface tack and which have a high degree of surface luster.

In accordance with the method of this invention, a vulcanized rubber workpiece is treated with a dilute peracetic acid solution at moderately elevated temperatures. The treatment with peractic acid suitably is effected by immersing the workpiece for about 4 to 10 minutes in a dilute aqueous solution of the peracid, that is an aqueous solution of the peracid containing about 1 to 4% of that ingredient, which is maintained at a temperature of about 130° to about 155° F. Following this treatment the workpiece is removed from the peracid solution, washed free of the peracid, and permitted to dry. The workpiece which results is tack-free and has a lustrous, attractive surface finish.

The treating agent employed herein is an aqueous peracetic acid solution. It is employed at a peracid concentration of about 1 to 4%, and at a pH below about 7. The peracetic acid normally is obtained at a pH of approximately 2.5 to 3, the peracetic acid itself providing a pH in this neighborhood and the solution of peracetic acid as it is obtained frequently containing some acetic acid either by reason of decomposition of the peracid or as a residue from preparation of the peracid. The pH of the diluted peracid solution can be adjusted up to about pH 7 by addition of alkaline materials, e. g. sodium hydroxide, however the peracetic acid is subject to decomposition at a pH greater than about 7 and accordingly care should be exercised to maintain the solution at a pH below this level. Likewise, where it is desired to lower the peracetic acid solution pH, organic acids such as acetic acid, or inorganic acids such as sulfuric or nitric acids, may be employed.

It has been found that addition to the peracetic acid solution of a stabilizing amount of a stabilizer for this peracid, preferably a polyphosphate, improves the quality of products treated according to the present process. This likely is due to improved control of the rate of action of the peracid. Likewise, addition of a small amount of a nonionic or anionic detergent to the solution has been found to improve the appearance of products of this process. It is probable that the detergent serves as a cleansing agent, permitting the peracid more readily to attack the rubber surface and also removing therefrom foreign matter which detracts from the appearance of the rubber.

The vulcanized rubber workpiece to be treated may be a natural rubber, or a rubbery, synthetic conjugated diene polymer or copolymer wherein the conjugated diene has 4 to 6 carbon atoms. The conjugated diene polymers and copolymers include such common rubbers as polybutadiene rubber, polyisoprene rubber, polybutadiene-styrene rubber, polychloroprene rubber, polybutadiene-acrylonitrile rubber and the like. The rubbers can be employed in solid or liquid form, as latexes or as solutions. The liquid or solid rubbers normally are compounded with vulcanizing agents such as sulfur and related compounds, molded to form a product such as an overshoe, inflated rubber goods and the like, and vulcanized by the application of heat. The latexes or solutions of the rubbers suitably are compounded with vulcanizing agents, applied as coatings, impregnants and the like or for example used to prepare dipped goods, and thereafter cured with heat.

A vulcanized rubber workpiece prepared as described above is treated with the peracetic acid solution by any convenient means. Generally the treatment is effected by immersing the workpiece in the peracetic acid solution which is maintained at a temperature of from about 130° to about 155° F., and permitting the workpiece to remain in the solution for a period from about 4 to 10 minutes. Following the treatment the workpiece is washed free of the peracid solution. This washing may be effected with water, or where desired a neutralizer such as sodium carbonate may be added to the wash water. While in some cases it is possible to operate slightly outside the indicated temperature and time ranges, it has been found in most instances that treatment for less than 4 minutes or below about 130° F. results in products which retain their surface tack and lack of luster, while treatment of the rubber for more than about 10 minutes and at temperatures above 155° F. tends to affect the rubber deleteriously, causing it to lose its resiliency and become weak physically.

The efficiency of the treatment can be determined readily by simple, yet effective tests. The tackiness of the rubber can be determined by rubbing two surfaces of the rubber together and determining the resistance of these surfaces to slippage. It will be found normally that the vulcanized rubber products prior to treatment are highly resistant to slippage, whereas following their treatment they slide smoothly when rubbed together. The surface luster improvement likewise is readily noticeable, a visual inspection being all that is required in this case.

The following examples are given by way of illustration only and are not to be construed as limiting the conditions, ingredients, compounds or methods of use thereof which are within the scope of the present invention.

A rubber overshoe formulation, see below, was worked and formed into a sheet on a 2-roll rubber mill, and thereafter cured in a mold having a 0.125" cavity by heating at 287° F. for 30 minutes.

| Ingredient: | Weight in grams |
| --- | --- |
| Smoked sheet natural rubber | 100 |
| Reogen | 3 |
| Stearic acid | 0.5 |
| Paracoumarone resin | 2 |
| Zinc oxide | 3 |
| Whiting | 30 |
| Sulfur | 2.75 |
| Benzothiazyl disulfide | 0.6 |
| Mercaptobenzothiazole | 0.6 |
| Zinc dimethyldithiocarbanate | 0.12 |

The Reogen is a mixture of an oil-soluble sulfonic acid of high molecular weight with 80% of paraffin oil, and is produced by the R. T. Vanderbilt Company of 230 Park Ave., New York, N. Y.

The cured product presented a dull, non-reflective surface and when it was attempted to slide its surfaces against each other it was found impossible to do so by reason of their excessive surface tack.

The product was cut into 1" x 3" strips and these strips were treated as described in Examples 1 to 7.

Example 1

A rubber strip prepared as described above was immersed for 5 minutes in a 2% peracetic acid solution having a pH of 2.6, which was maintained at 140° F., and thereafter was removed from the solution and washed with cold water.

The treated strip presented a lustrous, glossy surface, and its surfaces could be rubber over each other readily with little resistance to slippage.

Example 2

A rubber strip prepared as described above was immersed for 5 minutes in a 2.4% peracetic acid solution containing 0.15% of tetrasodium pyrophosphate and having a pH of 2.8, which was maintained at 140° F. Following this treatment the rubber strip was washed free of solution with cold water.

The treated strip had a lustrous and non-tacky surface similar to the treated product of Example 1.

Example 3

A rubber strip prepared as described above was immersed for 5 minutes in a 1.5% peracetic acid solution containing 0.12% of sodium hexametaphosphate, which was maintained at 130° F. Following this treatment the rubber strip was washed free of the solution with cold water.

The treated rubber strip had a lustrous and smooth surface similar to the treated rubber strip of Example 1.

Example 4

A rubber strip prepared as described above was immersed for 4 minutes in a 4% solution of peracetic acid containing 0.15% of sodium hexametaphosphate, which was maintained at 130° F. Following this treatment the rubber strip was washed free of the solution with cold water.

The treated rubber strip had a lustrous and smooth surface similar to the treated rubber strip of Example 1.

Example 5

A rubber strip prepared as described above was immersed for 5 minutes in a 2.4% solution of peracetic acid containing 0.5% of sodium hexametaphosphate, and having a pH of 5, which was maintained at 150° F. Following this treatment the rubber strip was washed free of the solution with cold water.

The treated rubber strip had a lustrous and smooth surface similar to the treated rubber strip of Example 1.

Example 6

A rubber strip prepared as descirbed above was immersed in a 2.4% peracetic acid solution containing 0.03% of Triton X–100 and 0.15% of hexametaphosphate and having a pH of 2.2, which was maintained at 150° F., for 5 minutes. Following this the rubber strip was washed free of solution with cold water. The Triton X–100 is an alkyl aryl polyether alcohol detergent, and is produced by the Rohm and Haas Company, of Philadelphia, Pa.

The treated rubber strip had a lustrous and smooth surface similar to the treated rubber strip of Example 1.

Example 7

A rubber strip prepared as described above was immersed for 10 minutes in a 2.4% solution of peracetic acid having a pH of 2.4, which was maintained at 130° F. Following this treatment the rubber strip was washed free of the solution with cold water.

The treated rubber strip had a lustrous and smooth surface similar to the treated rubber strip of Example 1.

Example 8

The following formulation was worked and sheeted out on a 2-roll rubber mill, following which it was cured at 300° F. for 20 minutes in a mold measuring 6" x 6" x 0.125".

| Ingredient: | Weight in grams |
| --- | --- |
| GRS (70–30 butadiene-styrene rubber) | 100 |
| Dixie clay | 15 |
| Heavy petroleum oil | 20 |
| Stearic acid | 2 |
| Zinc oxide | 5 |
| Sulfur | 2.75 |
| Benzothiazyl disulfide | 1.5 |
| Copper dimethyldithiocarbonate | 0.2 |

A 1" x 3" strip of the above product was immersed for 5 minutes in a 2.4% peracetic acid solution containing 0.15% of sodium hexametaphosphate and having a pH of 2.2, which was maintained at 150° F. The rubber strip then was washed free of solution with cold water.

The cured rubber sheet product prior to the above peracetic acid treatment had a dull, non-glossy surface finish and presented a tacky surface, such that when two surfaces of the sheet were contacted it was impossible to slide one over the other. Following the peracetic acid treatment the rubber strip had a glossy, lustrous appearance and two surfaces of the treated strip could be rubbed together without undue resistance to slippage.

The examples illustrate the treatment of natural rubber and polybutadienestyrene rubber workpieces. Similar results are obtainable with the other synthetic rubbers such as polybutadieneacrylonitrile rubber, polychloroprene rubber, polyisoprene rubber, polybutadiene rubber and the like.

What is claimed is:
1. Method of detackifying and improving the surface luster of a vulcanized rubber workpiece, which method comprises immersing said workpiece for from about 4 to 10 minutes in an aqueous solution of peracetic acid having a peracetic acid concentration of about 1 to 4% and having a pH of less than about 7, said solution being maintained during the immersion at a temperature of about 130° to 155° F.

2. Method of detackifying and improving the surface luster of a vulcanized rubber workpiece, which method comprises immersing said workpiece for from about 4 to 10 minutes in an aqueous solution of peracetic acid having a peracetic acid concentration of about 1 to 4% and having a pH of less than about 7, and containing about 0.1 to 0.5% of a stabilizer for the peracid, said solution being maintained during the immersion at a temperature of about 130° to 155° F.

3. Vulcanized rubber workpiece having a lustrous, tack-free surface, said workpiece having been treated in accordance with the method of claim 1.

References Cited in the file of this patent

UNITED STATES PATENTS 1,928,988     Watkins _____ Oct. 3, 1933

OTHER REFERENCES

The Merck Index, 6th edition, page 730.